Jan. 4, 1944.   P. J. McANDREWS   2,338,127
VALVE
Original Filed Dec. 3, 1941
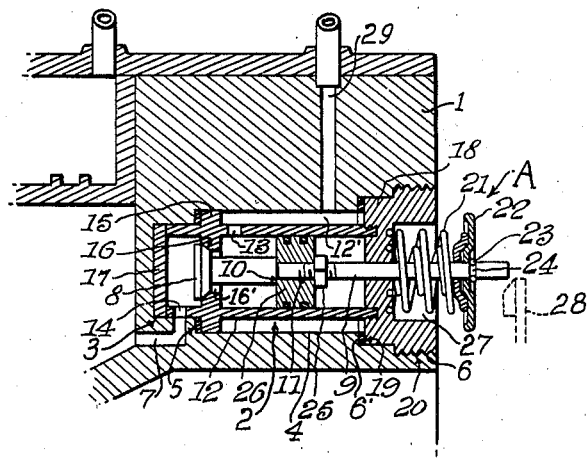
INVENTOR
PETER J. McANDREWS
BY
ATTORNEYS Patented Jan. 4, 1944

2,338,127

UNITED STATES PATENT OFFICE 2,338,127

VALVE

Peter J. McAndrews, Jamaica, N. Y.

Original application December 3, 1941, Serial No. 421,476. Divided and this application May 27, 1942, Serial No. 444,698

2 Claims. (Cl. 251—128)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved poppet valve, and more particularly to a poppet valve for use in connection with prime movers such as shown in my copending application Serial No. 421,476, filed December 3, 1941, of which this application is a division.

It is the object of my invention to provide a balanced poppet valve which is suitable for use either as an inlet valve or as an exhaust valve.

Other objects and advantages of my invention will become apparent upon a consideration of the following detailed description and the accompanying drawing, in which the figure is a cross-sectional view of an embodiment of my invention.

A portion 1 of a prime mover such as illustrated in my copending application above referred to is provided in which a recess 2 is formed, said recess 2 including a reduced portion 3 at its inner end, an enlarged cylindrical portion 4, forming a shoulder 5 and an enlarged threaded portion 6 at its outer end forming a shoulder 6'. A passage 7 is formed in the portion 1 of the prime mover, which passage 7 leads from within the reduced portion 3 of the recess to without the portion 1. A passage 29 leading into the recess 2 is also formed in the portion 1 of the prime mover.

A poppet valve assembly indicated generally by A is mounted within the recess 2 and comprises a head 8 of a valve, the stem 9 of which has a suitable shouldered portion 10 and a threaded portion 11 having a piston 26 threaded thereon and held against the shouldered portion 10 by a lock nut 25. The valve acts in a cylinder cage 12 which is of a smaller diameter than the diameter of the cylindrical portion 4 of the recess 2 whereby a steam space 12' is formed around it. The cylinder cage 12 includes an inlet steam port 13 on one side thereof, an outlet steam port 14 on its other side adjacent to its inner end, which outlet steam port 14 registers with the passage 7 in the portion 1 of the prime mover, a flange 15 which abuts against the shoulder 5 of the recess 2 and a valve seat 16 of an opening 16'. The exhaust end of the cylinder cage 12 is closed by a cylindrical head 17 fitted into the reduced portion 3 of the recess 2. The opposite end of the cylinder cage 12 is threaded to fit into the inner end of a spring holder 18 which is formed to have a landing shoulder 19 abutting against the shoulder 6' in the recess 2. The spring holder 18 also includes a threaded portion 20 threaded on the enlarged portion 6 of the recess 2 and a well 27 formed in its outer end for a purpose which will hereinafter appear, said threaded portion 20 of the spring holder 18 acting as a plug nut. The piston 26 has a steam tight fit against the inner wall of the cylinder cage 12 and is adapted for movement within the cylinder cage.

The outer end of the valve stem 9 extends through and is movably mounted on the spring holder 18 and is surrounded by retracting springs 21 which extend into the well 27 at one end. The retracting springs 21 abut against the spring holder 18 at their inner ends and are compressed by a spring cup 22 set over the valve stem 9 and held in place by means of a horseshoe washer 23 placed in recessed grooves 24 in the valve stem. The valve is operated by a cam rod 28 arranged to actuate the stem 9.

The operation of my improved valve is as follows:

Assuming the valve to be in its closed position as illustrated, steam under pressure entering through the passage 29 in the portion 1 of the prime mover, enters the space 12' around the cylinder cage 12 and then passes through the inlet port 13, where it enters the cylinder cage and, as the steam pressure builds up, pressure in the cylinder cage 12 will increase. Since the piston 26 offers a greater area to the steam than the valve head 8, the valve will tend to move in conjunction with the compressed springs 21 and firmly seat the valve. At the proper moment, the cam rod 28 lifts the valve from its seat 16 which allows the steam to pass from inlet port 13 around the valve head 8 through the valve opening 16' and out of the exhaust port 14. Since the piston 26 forms a steam tight fitting against the inner wall of cylinder cage 12, no stuffing box will be required where the valve stem 9 passes through the spring holder 18. The shoulders 15 and 19 of the valve assembly are so placed that they properly aline the inlet and exhaust ports 13 and 14, respectively, when the unit is installed in the coacting steam recess 2 in the portion 1 of the prime mover by means of the plug nut 20.

While I have described my invention with particularity, it is to be understood that I do not wish to be limited to the details disclosed since various modifications within the spirit of the invention will suggest themselves to those skilled in the art.

Having described my invention, what I claim as new and wish to secure by Letters Patent is:

1. A valve comprising a cylinder and a valve member movably mounted in said cylinder, said cylinder including a valve opening and having a spring holder mounted on one end thereof, an intake port in said cylinder adjacent to and spaced from one side of the valve opening and an exhaust port in the cylinder on another side and spaced from the valve opening, said valve member movably mounted in said cylinder and comprising a head engaging the valve opening adjacent to the exhaust port, a valve stem extending from said head through the spring holder, retracting springs surrounding said valve stem and engaging the spring holder, a member holding the retracting springs under compression, said springs adapted to normally hold the valve head in contact with said valve opening, a piston fixedly mounted on and movable with said valve stem, said piston positioned within said cylinder between said intake port and spring holder, and means for actuating said valve stem to actuate the piston in the cylinder and the valve head from the valve opening against the action of said retracting springs.

2. A valve assembly adapted to be installed in a recess formed in a prime mover having an exhaust passage formed therein extending from said recess, said recess including an enlarged threaded portion and said valve assembly comprising a cylinder and a valve member movably mounted in said cylinder, said cylinder including a valve seat and having a spring holder mounted on one end thereof, said spring holder being in threaded engagement with the enlarged portion of said recess, an intake port in said cylinder adjacent to and spaced from one side of the valve seat and an exhaust port in the cylinder on another side and spaced from the valve seat, said exhaust port registering with said passage extending from the recess, said valve member comprising a head movably engaging the valve seat adjacent to the exhaust port, a valve stem extending from said head and movably mounted on and extending through said spring holder, retracting springs surrounding said valve stem and engaging the spring holder, a member holding the retracting springs under compression, said springs adapted to normally hold the valve head in contact with the valve seat, a piston fixedly mounted on and movable with said valve stem within said cylinder, and means for actuating said valve stem to actuate the piston in the cylinder and the valve head from the valve seat against the action of said retracting springs.

PETER J. McANDREWS.